United States Patent [19]
Takada et al.

[11] Patent Number: 5,617,276
[45] Date of Patent: Apr. 1, 1997

[54] MAGNETO-RESISTANCE EFFECT THIN-FILM MAGNETIC HEAD HAVING A LAMINATED FLUX GUIDE OF PERMALLOY AND TITANIUM FILMS

[75] Inventors: Akio Takada, Miyagi; Kazutoshi Asada, Chiba, both of Japan

[73] Assignee: Sony Corporation, Tokyo, Japan

[21] Appl. No.: 483,793

[22] Filed: Jun. 7, 1995

[30] Foreign Application Priority Data

Jun. 30, 1994 [JP] Japan .................................. 6-149891

[51] Int. Cl.$^6$ ......................................................... G11B 5/39
[52] U.S. Cl. ............................................. 360/113; 360/126
[58] Field of Search ....................................... 360/113, 125, 360/126; 324/252; 338/32 R

[56] References Cited

U.S. PATENT DOCUMENTS

| | | | |
|---|---|---|---|
| 4,816,947 | 3/1989 | Vinal et al. | 360/113 |
| 5,142,426 | 8/1992 | Re et al. | 360/126 |
| 5,313,356 | 5/1994 | Ohkubo et al. | 360/126 |
| 5,379,172 | 1/1995 | Liao | 360/126 |
| 5,388,019 | 2/1995 | Argyle et al. | 360/126 |
| 5,465,185 | 11/1995 | Heim et al. | 360/113 |
| 5,503,870 | 4/1996 | Fontana et al. | 427/130 |
| 5,535,077 | 7/1996 | Saito et al. | 360/113 |
| 5,546,254 | 8/1996 | Gill | 360/113 |

FOREIGN PATENT DOCUMENTS

| | | |
|---|---|---|
| 0064786 | 11/1982 | European Pat. Off. . |
| 0404332 | 12/1990 | European Pat. Off. . |
| 4140983 | 6/1992 | Germany . |
| 2003647 | 3/1979 | United Kingdom . |
| 2019638 | 10/1979 | United Kingdom . |

OTHER PUBLICATIONS

Ching Tsang, et al., "The Study of Recessed MR Sensors With Un-Laminated and Multi-Laminated Flux-Guides," (Apr. 13, 1992) Proceedings of the International Magnetics Conference (INTERMAG), St. Louis, Apr. 13–16, 1992, NR.–, page(s) BA02, Institute of Electrical and Electronics Engineers.

Patent Abstracts of Japan, vol. 010, No. 288 (P–502), Sep. 30, 1986 and JP–A–61 105717 (Sanyo Electric Co., Ltd.), May 23, 1986.

Patent Abstracts of Japan, vol. 010, No. 312 (P–509), Oct. 23, 1986 and JP–A–61 123011 (Sanyo Electric Co., Ltd.), Jun. 10, 1986.

*Primary Examiner*—Jefferson Evans
*Attorney, Agent, or Firm*—Hill, Steadman & Simpson

[57] ABSTRACT

A magneto-resistance effect thin-film magnetic head with a flux guide for efficiently guiding the signal magnetic flux from the magnetic recording medium to a magneto-resistance effect film. The flux guide is made up of a laminated structure of alternate layers of permalloy and Ti so that the number of the permalloy films is two or more. The flux guide may be formed by an underlying layer and the laminated structure formed on the underlying layer. The film thickness T1 of the permalloy film and the film thickness T2 of the Ti film preferably are such that 0 nm<T1<50 nm and 0 nm<T2<6 nm. The flux guide of the MR head may be formed easily and is excellent in magnetic characteristics. The playback signal output of the MR head may be improved without complicating the production process of the MR head.

7 Claims, 5 Drawing Sheets

MAGNETO-RESISTANCE EFFECT THIN-FILM MAGNETIC HEAD HAVING A LAMINATED FLUX GUIDE OF PERMALLOY AND TITANIUM FILMS

BACKGROUND OF THE INVENTION

The present invention generally relates to magneto-resistance effect magnetic heads employing a magneto-resistance effect film, the resistance of which is changed by the influence of a recorded signal's magnetic field on a magnetic recording medium, the change in the resistance of the magneto-resistance effect film being detected as a playback output voltage. More particularly, the invention relates to a flux guide for efficiently capturing the recorded signal's magnetic flux into the magneto-resistance effect film.

A magneto-resistance effect thin-film magnetic head (MR head) for detecting, as a playback output voltage, the change in resistance of a magneto-resistance effect film (MR film), the resistance value of which is changed by the influence of a recorded signal's magnetic field on a magnetic recording medium, is characterized in that its playback output is not dependent on the running velocity of the medium and in that it exhibits a high playback output despite a slow medium running velocity. Thus the MR head is attracting attention as a magnetic head for realizing a small-size large-capacity hard disc device.

With such an MR head, since the change in resistance of the MR film is produced by changes in the recorded signal's magnetic field on the magnetic recording medium, it is desirable to guide the recorded signal's magnetic flux efficiently to the MR film for improving; the playback signal output. It has, therefore, been contemplated that a flux guide composed of a magnetic thin film can be put in contact with the MR film for efficiently guiding the signal magnetic flux to the MR film.

As such a flux guide, there has been proposed a flux guide formed by a permalloy plating and a laminated film structure composed of Ta and permalloy.

However, it is necessary that the flux guide have high magnetic permeability for efficiently guiding the signal magnetic flux to the MR film and to have magnetically stable characteristics for deriving a stable playback signal output from the MR film. It is also necessary that the flux guide be readily producible while satisfying these conditions of the magnetic characteristics.

Yet, a flux guide formed of permalloy has a low magnetic permeability, on the order of 1500. Moreover, it is magnetically unstable because it has a magnetic wall within the flux guide surface.

On the other hand, a flux guide, made up of laminated film composed of Ta and permalloy, can have a sole magnetic domain, and hence is magnetically stable and may be expected to have high magnetic permeability. However, Ta is a high-melting material and has to be formed into a film by sputtering, so that it is difficult to form into a film by continuous vapor deposition, which is an easy film-forming method.

SUMMARY OF THE INVENTION

It is an object of the present invention to improve a playback output of an MR head, without complicating the production process for the MR head, by providing a flux guide which may be produced easily and which is superior in magnetic characteristics.

In an embodiment, the present invention provides a magneto-resistance effect thin-film magnetic head MR head including a flux guide for efficiently guiding a signal magnetic flux from a magnetic recording medium to a magneto-resistance effect film, wherein the flux guide has a laminated film structure comprised of permalloy and Ti films alternated with each other, with the number of the permalloy films being two or more.

Since the flux guide of the MR head is usually shaped to a desired configuration by film forming of a pre-set material on an MR device, followed by etching, it is possible to obtain an etching selection ratio between the flux guide and the MR device. Thus it is preferable that an underlying layer of Ta or the like, with which it is possible to realize an etching selection ratio with the MR device, be formed as the lowermost layer of the flux guide. Thus, the flux guide preferably is formed of the underlying Ta layer and the above-mentioned laminated film structure formed on the underlying layer. The underlying layer is not limited to Ta if it only is of such material as to realize the etching selection ratio with the MR device.

If, with the above flux guide for an MR head, the permalloy film has too large a film thickness value T1, a magnetic wall is produced in the flux guide such that a sole magnetic domain cannot be produced. Therefore, the film thickness T1 preferably is not larger than 50 nm. On the other hand, a smaller value of the film thickness T2 of the Ti film is preferred in order to maintain soft magnetic characteristics of the permalloy film. Specifically, the preferred value of the film thickness T2 is 6 nm or less. Thus it is preferred with the above flux guide that the film thickness T1 of the permalloy film and the film thickness T2 of the Ti film be such that 0 nm<T1<50 nm and 0 nm<T2<6 nm.

There is no limitation as to the type of MR head having the flux guide. For example, an MR head may be of such a type in which the bias magnetic field is applied to the MR film by a bias conductor or in which the MR film is connected in series with a bias conductor. An MR head of the present invention may be used by itself as a playback head or may be integrated with a recording magnetic head, such as an induction thin-film magnetic head, to form a composite head.

By forming the flux guide as a laminated film composed of permalloy and Ti films, the flux guide may be of a sole magnetic domain to assure magnetic stability and high magnetic permeability.

Since the permalloy and Ti both melt at about 1500° C., the laminated film structure making up the flux guide may be formed easily by continuous vapor deposition.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
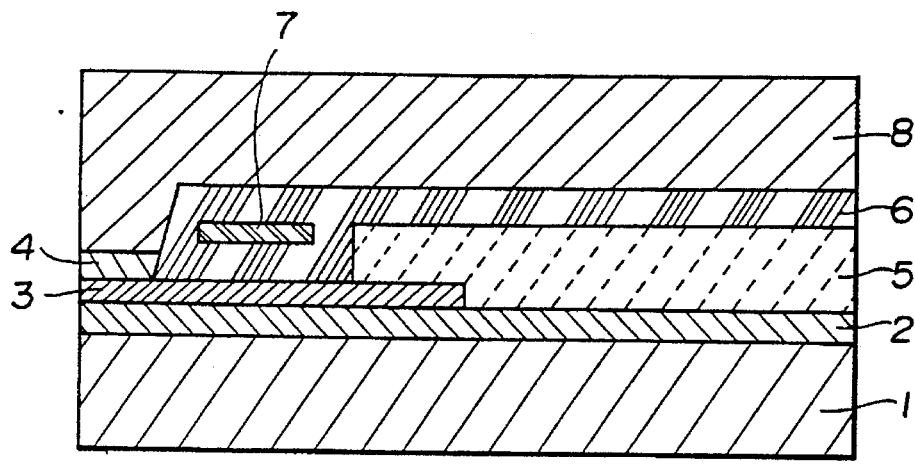
FIG. 1 is a transverse cross-sectional view showing an example of an MR head according to the present invention.

Referring to the drawings, preferred embodiments of the present invention will be explained in detail.

First Embodiment

An MR head of a first embodiment of the invention (Example 1) is an MR head in which a bias conductor for applying a bias magnetic field to a MR film is arranged on a MR film.

As shown in FIG. 1, an MR head has a lower shield layer 1 formed of a magnetic material, a lower gap layer 2 of a non-magnetic material formed on the lower shield layer 1, and an MR film 3 formed on one end of the lower gap layer 2. The MR head also has an upper gap layer 4 of a non-magnetic material formed on a forward portion of the MR film 3, that is, towards a medium contacting surface of the MR head, a flux guide 5 formed for being partially overlapped with the rear end of the MR film 3 and an insulating layer 6 formed on the MR layer 3 and on the flux guide 5. Finally, the MR head has a bias conductor 7 arranged within the interior of the insulating layer 6 for overlying the MR film 3, and an upper shield layer 8 of a magnetic material, formed on the upper gap layer 4 and the insulating layer 6.

The lower shield layer 1, lower gap layer 2, upper gap layer 4 and the upper shield layer 8 serve to prohibit signal magnetic flux from the magnetic recording medium other than that to be reproduced from being captured into the MR film 3. That is, since the lower shield layer 1 and the upper shield layer 8 are arranged above and below the MR film 3 with the lower gap layer 2 and the upper gap layer 4 in-between, signal magnetic flux from the magnetic recording medium other than that to be reproduced is conducted to the lower shield layer 1 and the upper shield layer 8, such that only the magnetic flux to be reproduced is captured into the MR film 3.

On both extreme ends of the MR film 3 are arranged electrodes for supplying the sense current to the MR film 3. The upper gap layer 4 may be formed of an electrically conductive non-magnetic material and may be simultaneously used as the forward side electrode provided on the forward side of the MR film 3. The electrode disposed on the rear side of the MR film 3 may also be formed on the flux guide 5, or the flux guide 5 may be used simultaneously as the rear side electrode.

Figure 2:
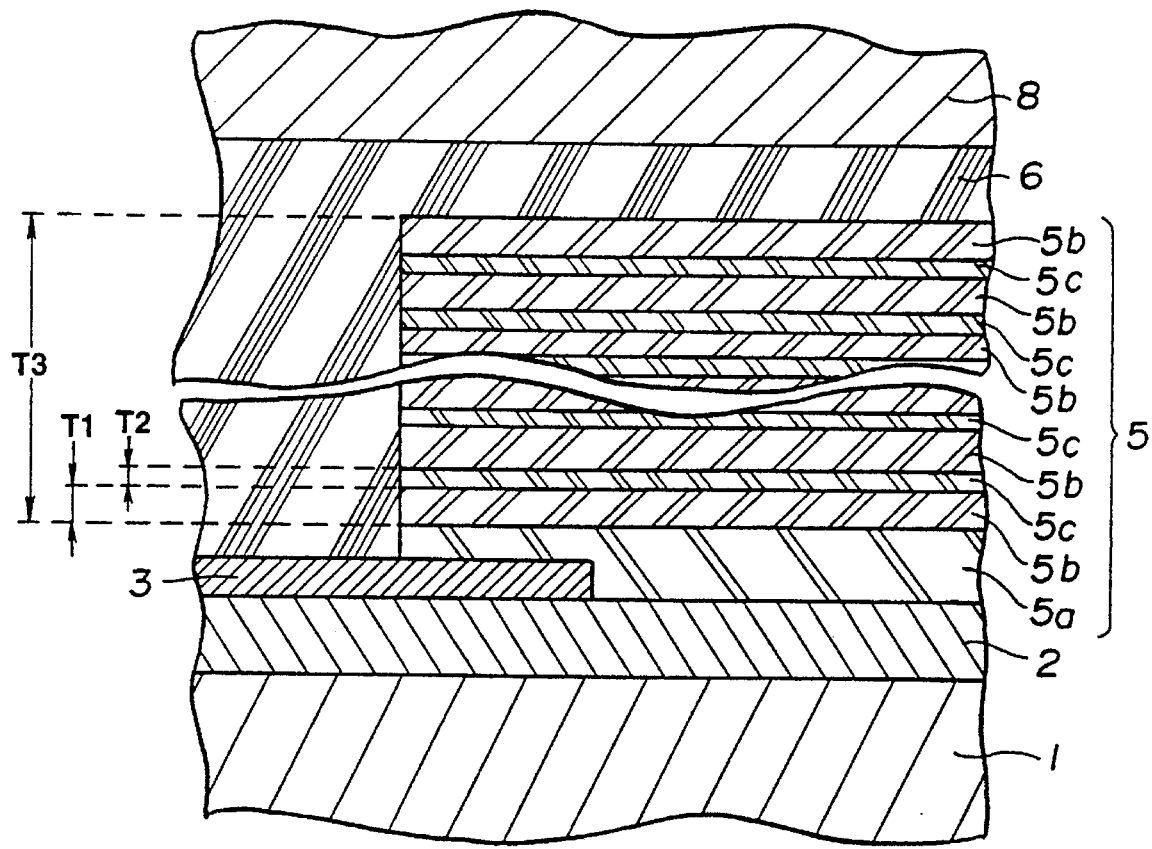
FIG. 2 is an enlarged transverse cross-sectional view showing essential parts of a flux guide portion of the MR head shown in FIG. 1.

The flux guide 5 is formed on the MR film 3 and the lower gap layer so as to be partially overlapped with the rear end of the MR film 3, and is comprised of a laminated film structure of permalloy films 5b and Ti films 5c formed on the underlying layer 5a of Ta, as shown in FIG. 2. The laminated film structure is designed so that the number of the permalloy films 5b is two or more and the uppermost and lower-most layers are the permalloy films 5b. The film thickness T1 of the permalloy film 5b is such that 0 nm<T1≦50 nm and the film thickness T2 of the Ti film 5c is such that 0 nm<T2≦6 nm. Meanwhile, the film thickness T3 of the laminated film structure in its entirety is preferably on the order of 100 nm<T3≦500 nm.

Second Embodiment

The MR head of a second embodiment of the invention (Example 2) is an MR head in which a bias conductor for applying a bias magnetic field to the MR film is arranged below the MR film.

Figure 3:
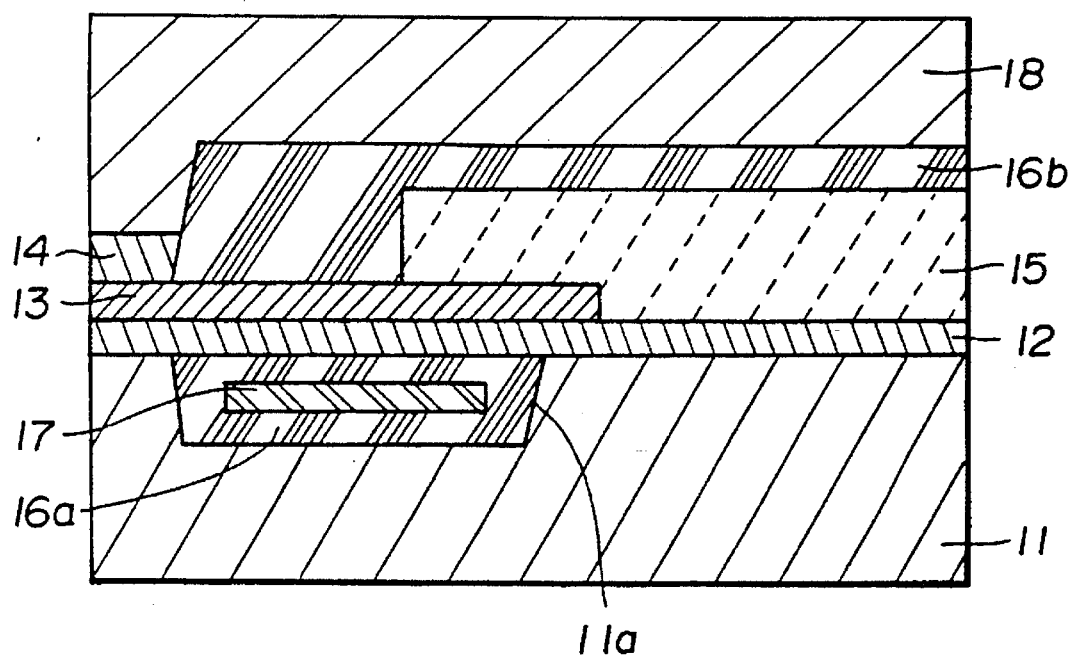
FIG. 3 is a transverse cross-sectional view showing another example of an MR head according to the present invention.

As shown in FIG. 3, the MR head of this second embodiment has a lower shield layer 11 of a magnetic material, a groove 11a formed in the lower shield layer 11 in registration with a MR film 13, as explained below, and a first insulating layer 16a formed in the inside of the groove 11a. The MR head also has a bias conductor 17 arranged in the inside of the first insulating layer 16a for underlying the MR film 13, as explained below, a lower gap layer 12 of a non-magnetic material formed on the lower shield layer 11, and the first insulating layer 16a and an MR film 13 formed towards one end of the gap layer 12. The MR head also has an upper gap layer 14 of a non-magnetic material formed at a forward end of the MR film 13, that is, towards the medium contacting surface of the MR head, a flux guide 15 formed so as to be partially overlapped with the rear end of the MR film 13, a second insulating layer 16b formed on the MR film 13 and the flux guide 15, and an upper shield layer 18 of a magnetic material formed on the upper gap layer 14 and the second insulating layer 16b.

Accordingly, the MR head of the second embodiment is configured similarly to that of Example 1 except that the bias conductor 17 is arranged below the MR film 13.

Evaluation of the Flux Guide

Evaluations were made of the magnetic characteristics of the flux guide employed in an MR head as previously described. For such evaluation, a flux guide was employed which was made up of six layers of permalloy films, each with film thickness of 50 nm, and six layers of Ti films, each with film thickness of 5 nm, laminated on a Ta underlying layer.

Figure 4:
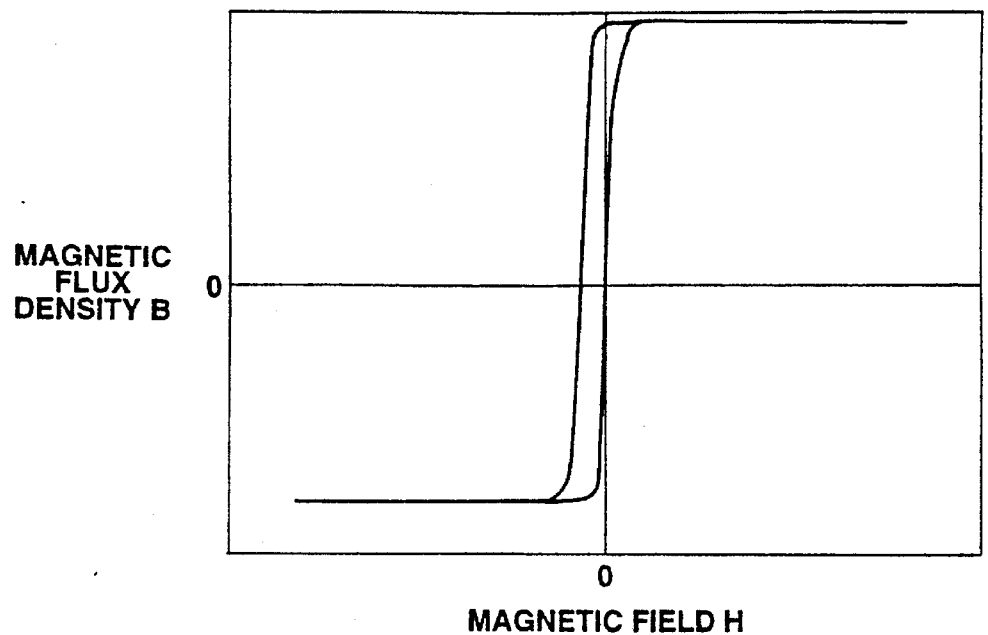
FIG. 4 is a graph showing an example of a magnetization curve along the easy axis of the flux guide employed in an MR head according to the present invention.
Figure 5:
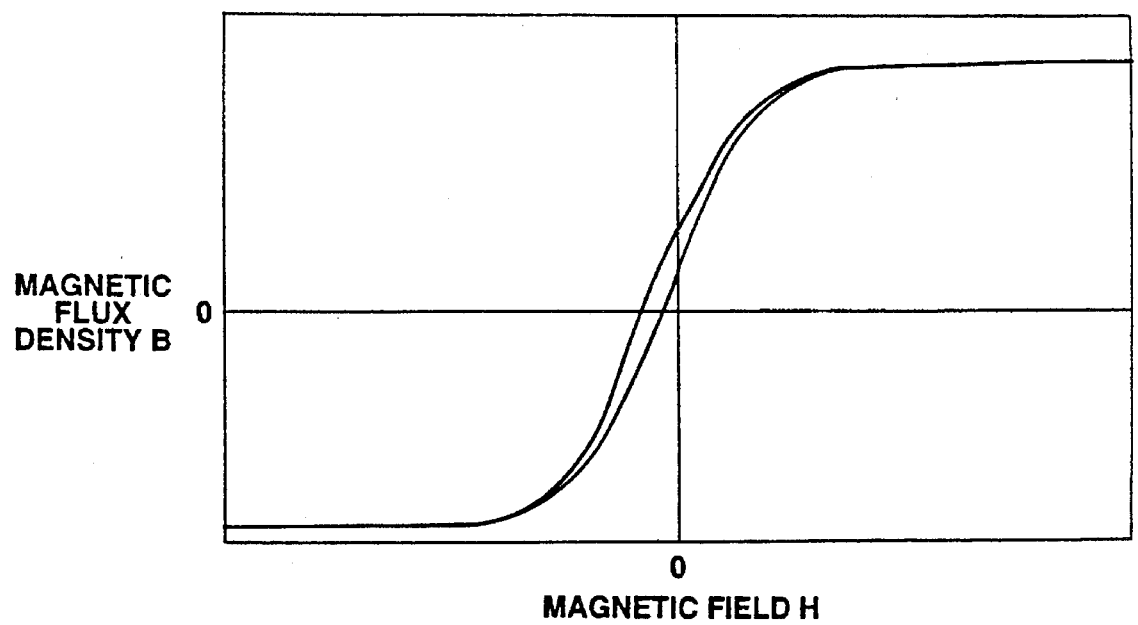
FIG. 5 is a graph showing an example of a magnetization curve along the hard axis of the flux guide employed in an MR head according to the present invention.

A magnetization curve of the flux guide was first investigated. Figures 4 and 5 show magnetization curves along the axis of easy magnetization and along the axis of hard magnetization, respectively. It was thus found that a coercive force Hc along the easy axis was 0.33 Oe, while that along the difficult axis was 0.24 Oe. The coercive force Hc with usual permalloy is on the order of 2 Oe. Thus the present flux guide may be said to be superior in soft magnetic characteristics.

Figure 6:
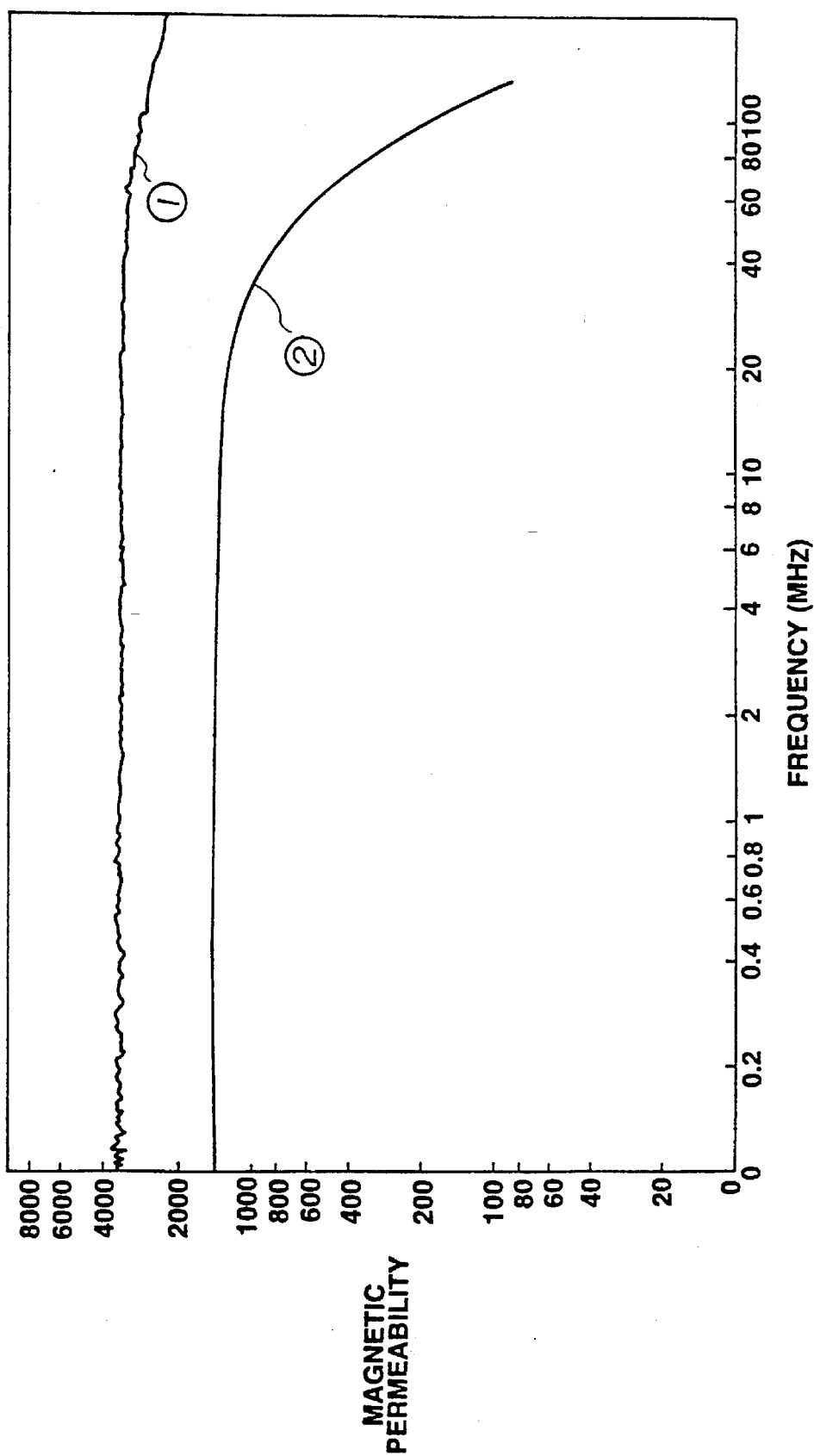
FIG. 6 is a graph showing an example of frequency characteristics of magnetic permeability of the flux guide employed in an MR head according to the present invention.

The frequency characteristics of magnetic permeability of the flux guide were then investigated. The results are shown in FIG. 6. In FIG. 6, encircled numeral (1) denotes the results of measurement of frequency characteristics of magnetic permeability of the flux guide and encircled numeral (2) denotes, by way of comparison, those of usual permalloy. It can be seen from FIG. 6 that the flux guide has high magnetic permeability as compared to the usual permalloy and remains stable in the high frequency range. Thus it becomes possible with the present flux guide to capture the magnetic flux into the MR film in stability even although the frequency of the recording signal is increased.

Figure 7:
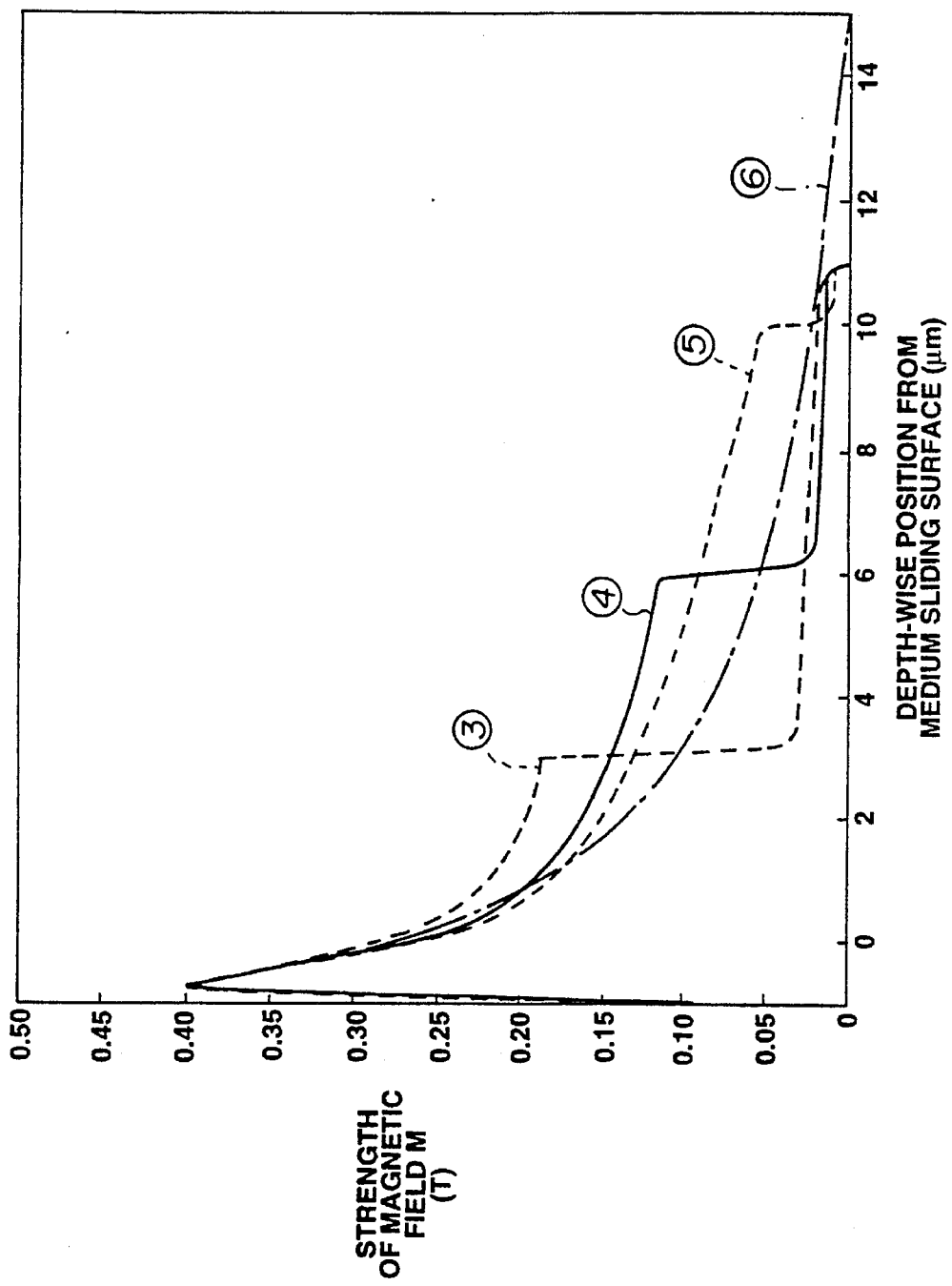
FIG. 7 is a graph showing the results of simulation of the magnetic field strength distribution in an MR head according to the present invention.

Then, a simulation was conducted of the effects derived on application of the above-described flux guide to an MR head. The results are shown in FIG. 7. In FIG. 7, in which the ordinate and the abscissa denote the strength M of the magnetic field and the MR head position along the depth as from the medium contacting surface of the MR head, respectively. The encircled numerals (3), (4), (5) and (6) denote curves for the flux guide being arranged at position 3 μm or more along the depth of the MR head from the medium contacting surface, for the flux guide being arranged at position 6 μm or more along the depth of the MR head from the medium contacting surface, for the flux guide being arranged at position 10 μm or more along the depth of the MR head from the medium contacting surface, and for the flux guide being not arranged, respectively. It is seen from these results that, by arraying the flux guide, the magnetic flux may be efficiently captured into the inside of the MR head. In addition, by arraying the flux guide, the intensity M of the magnetic field in the vicinity of the medium contacting surface is increased, so that, even if the length of the MR film along the depth of the MR head is reduced, a sufficient amount of the magnetic flux may be conducted to the MR film. Thus, the playback efficiency of the MR head may be improved by decreasing the length of the MR film for decreasing the impedance.

It is seen from above that, according to the present invention, the flux guide may be of a sole magnetic domain thereby assuring magnetic stability and high magnetic permeability on the order of 3000. The result is that the signal magnetic flux from the magnetic recording medium may be efficiently captured with stability into the MR film for improving the playback signal output of the MR head in stability.

Above all, with the flux guide employed in the present invention, high magnetic permeability may be maintained in stability even at the high frequency range of tens of MHz. Thus, the magnetic flux capturing effect into the MR film by the flux guide may be produced in stability even if the recording signal on the magnetic recording medium is increased in frequency.

With the flux guide of the present invention, having a laminated film structure of permalloy and Ti, the laminated film structure may be formed easily by continuous vapor deposition since the melting points of permalloy and Ti are both on the order of 1500° C. Thus the superior effect of the flux guide may be achieved without complicating the production process of the MR head. The flux guide may also be produced by the sputtering technique, instead of by continuous vapor deposition. Thus, the flux guide may be formed by any desired method which is in meeting with the MR head production process.

Although modifications and changes may be suggested by those skilled in the art, it is the intention of the inventors to embody within the patent warranted hereon all changes and modifications as reasonably and properly come within the scope of their contribution to the art.

We claim:

1. A magneto-resistance effect magnetic head comprising:
a magneto-resistance effect device interposed between a pair of magnetic shield cores;
a bias conductor operatively disposed in overlapping relationship with said magneto-resistance effect device to allow a magnetic bias to be imparted thereto; and
a flux guide interposed between an upper insulation layer and a lower nonmagnetic gap forming layer or efficiently guiding a signal magnetic flux from a magnetic recording medium to a magneto-resistance effect film, wherein:
said flux guide has a laminated film structure composed of permalloy and Ti films alternated with each other, the number of the permalloy films being two or more,
said flux guide, said upper insulation layer and said lower gap forming layer are disposed between said shield cores at a rear end of said head, and
said magneto-resistance effect device is interposed between said lower gap forming layer and an upper nonmagnetic gap forming layer which in turn are interposed between said shield cores at a forward end of said head.

2. The magneto-resistance effect thin-film magnetic head as claimed in claim 1, wherein the flux guide has a layer of Ta underlying the laminated film structure.

3. The magneto-resistance effect thin-film magnetic head as claimed in claim 2, wherein each permalloy film has a film thickness T1 such that 0 nm<T1<50 nm and each Ti film has a film thickness T2 such that 0 nm<T2<6 nm.

4. The magneto-resistance effect thin-film magnetic head as claimed in claim 1, wherein each permalloy film has a film thickness T1 such that 0 nm<T1<50 nm and each Ti film has a film thickness T2 such that 0 nm<T2<6 nm.

5. The magneto-resistance effect thin film magnetic head as claimed in claim 1, wherein the flux guide has a sole magnetic domain.

6. The magneto-resistance effect thin-film magnetic head as claimed in claim 1, wherein the laminated film structure of making up the flux guide is formed by continuous vapor deposition.

7. A magneto-resistance effect thin-film magnetic head comprising:
a magneto-resistance effect device interposed between a pair of magnetic shield cores,
a bias conductor operatively disposed in overlapping relationship with said magneto-resistance effect device to allow a magnetic bias to be imparted thereto; and
a flux guide interposed between an upper insulation layer and a lower nonmagnetic gap forming layer for efficiently guiding a signal magnetic flux from a magnetic recording medium to a magneto-resistance effect film, wherein:
said flux guide has a laminated film structure composed of permalloy and Ti films alternated with each other, the number of the permalloy films being two, three, or more,
said flux guide, said upper insulation layer and lower gap forming layer are disposed between said shield cores at a rear end of said head,
said magneto-resistance effect device is interposed between said lower nonmagnetic gap forming layer and an upper nonmagnetic gap forming layer, which in turn are interposed between said shield cores at a forward end of said head,
said flux guide has a layer of Ta underlying the laminated film structure, each permalloy film having a film thickness T1 such that 0 nm<T1<50 nm and each Ti film has a film thickness T2 such that 0 nm<T2<6 nm, and
said flux guide has a sole magnetic domain.

* * * * *